United States Patent

[11] 3,584,921

| | | | | |
|---|---|---|---|---|
| [72] | Inventor | Kenneth D. E. Crawford<br>London, England | 3,398,994 8/1968 Smith | 303/21 A4 |
| [21] | Appl. No. | 793,141 | 3,482,887 12/1969 Sheppard | 303/3X |
| [22] | Filed | Jan. 22, 1969 | | |
| [45] | Patented | June 15, 1971 | | |
| [73] | Assignee | Westinghouse Brake and Signal<br>Company, Limited,<br>London, England | | |
| [32] | Priority | Feb. 7, 1968 | | |
| [33] | | Great Britain | | |
| [31] | | 6106/68 | | |

*Primary Examiner*—Duane A. Reger
*Attorney*—Larson, Taylor & Hinds

[54] BRAKING SYSTEMS AND/OR TRACTIVE
8 Claims, 6 Drawing Figs.

[52] U.S. Cl............................................................ 303/21,
303/3, 303/20
[51] Int. Cl............................................................. B60t 8/08
[50] Field of Search............................................ 303/3, 16,
20, 21 A4; 192/.034, 1, 2, 7, 9

[56] References Cited
UNITED STATES PATENTS
2,361,099   10/1944   Hines.......................... 303/3X ABSTRACT: A system for controlling the braking or tractive forces applied to the wheels of a wheeled vehicle is provided wherein a signal corresponding to the rate of change of the peripheral speed of a wheel is derived and a control circuit, responsive to this signal attaining a value corresponding to an excessive rate of change of peripheral speed, produces a control signal for causing appropriate modification of the tractive forces, in the case of spinning wheels, or of the braking forces, in the case of spinning wheels, or of the braking forces, in the case of sliding wheels. The charge on a capacitor in the control circuit, which normally follows a voltage corresponding to the speed of the wheel, varies at an independent, different rate upon production of the control signal, and traction or braking is resumed when the voltage on the capacitor equals the speed voltage, a time in advance of regained correspondence between the wheel and vehicle speed.

3,584,921

BRAKING SYSTEMS AND/OR TRACTIVE

This invention relates to the control of braking systems and/or tractive systems and although the invention is particularly applicable to such systems when employed in railway vehicles, it is also applicable to other wheeled vehicles such as road vehicles or aircraft.

There are two situations which are particularly objectionable in respect of acceleration and deceleration of wheeled vehicles whether the vehicle be a rail or road vehicle, namely, the situation in acceleration in which due to excessive torque being applied to the wheels, the wheels are caused to spin (i.e. the peripheral velocity of the wheels is greater than the velocity of the vehicle) thus causing a loss of tractive effort; and the situation in deceleration in which, due to excessive braking effort being applied to the wheels, the wheels are caused to slide (i.e. the peripheral velocity of the wheels is less than the velocity of the vehicle thus causing loss of at least some of the braking effort and excessive wheel or track wear. By the present invention there is provided a control for braking and/or tractive systems by which, as desired, one or both of these objectionable situations can be obviated or at least reduced.

The Specification of British Pat. No. 983,869 describes and claims apparatus for controlling the braking and/or tractive forces on a wheeled vehicle including means for deriving a signal representing the rate of change of peripheral velocity of a wheel of the vehicle and modifying means responsive to a value of signal representing an excessive rate of change of peripheral velocity of one sign or the other to introduce appropriate modifications of the tractive or braking force to tend to prevent spinning or sliding of the wheel as the case may be, said modifying means being further responsive to the signal such as to maintain the modification of the force in the same sense following a change of sign of the rate of change of peripheral velocity due to the modified force until the rate of change of peripheral velocity as indicated by said signal is no longer excessive.

The system proposed in the above mentioned specification in effect nurses a wheel back from a condition under which it has an excessively greater or lesser peripheral velocity than the velocity of the vehicle to a condition in which the difference between peripheral velocity and actual vehicle speed is no longer excessive. In so doing, the system, while protecting the wheel or wheels against undue wear, can in a system such as a pneumatic braking system as employed on rail vehicles, give rise to improved overall braking efficiency for given conditions of adhesion. Nevertheless, due to inherent delay times which are present in braking systems, especially those employing the transmission of changes in and response to fluid pressures such a system may have certain shortcomings due to correction measures not being immediately removed by the time complete adhesion has been regained between a vehicle and the surface upon which it runs.

According to the present invention, there is provided apparatus for controlling braking and/or tractive forces on a wheeled vehicle including means for deriving a speed signal representative of the peripheral velocity of a wheel of the vehicle a signal representing the rate of change of peripheral speed of said wheel and a modifying circuit responsive to a value of said latter signal representing an excessive rate of change of peripheral velocity to produce a modification signal operable to cause appropriate modification to tractive or braking forces on the wheel to tend to reduce spinning or sliding of the wheel as the case may be, and including means for comparing said speed signal with an independently varying signal carried by a storage device in an electrical time constant circuit, the modifying circuit being responsive to attainment of a predetermined relationship between the speed signal and the independently varying signal to initiate at least partial removal of the modification in advance of full adhesion being regained.

The independently varying signal is preferably but not necessarily a linearly varying signal which corresponds, at initiation of the modification signal to the speed of the wheel.

In the subsequent description of the invention, the expression "spin" is to be taken to mean the phenomenon which occurs when tractive forces applied to a wheel are greater than can be accommodated within the limits of friction such that slipping occurs between the vehicle and the surface upon which it runs. The expression "slide" is to be taken to means the phenomenon which occurs when braking forces applied to the wheel are greater than can be accommodated within the limits of friction such that skidding occurs between the vehicle and the surface upon which it runs.

In order that the invention may be more clearly understood and readily carried into effect, the same will be further described by way of example with reference to the accompanying drawings in which.

Figure 1:
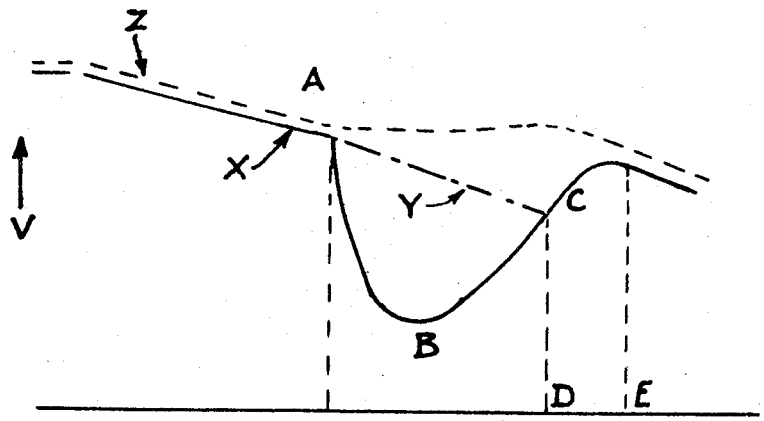
FIG. 1 illustrates slide correction graphically.

Referring initially to FIG. 1, the curve X represents the velocity curve of a rail vehicle wheel having a pneumatic braking system associated with it. At the point A, the braking force applied to the wheel is assumed to become excessive, adhesion is lost and the wheel begins to slide. Vehicle speed is represented by the dashed curve z. The excessive rate of retardation of the wheel is sensed by the system and the braking force is reduced. Hence, at the point B, the retardation curve of the wheel goes through a zero and the wheel begins to pick up speed again under friction towards the speed of the rail vehicle. At the point A, a capacitor initially charged to a voltage analogous of wheel peripheral speed commences a controlled rate of charge, in this case discharge as shown by curve Y and at the point C when the capacitor voltage is approximately equal to the rising wheel speed analog voltage, the braking forces begin to be reinstated. Hence, it is seen that by proper selection of the time constant for Y the system can be arranged to reintroduce braking at a point before the point E at which the wheel peripheral speed is substantially the same as the vehicle speed. Hence, advantage is taken of the period between D and a point somewhat to the left of E for obtaining some obtainable braking time which would otherwise be lost by the control system.

Figure 2A:
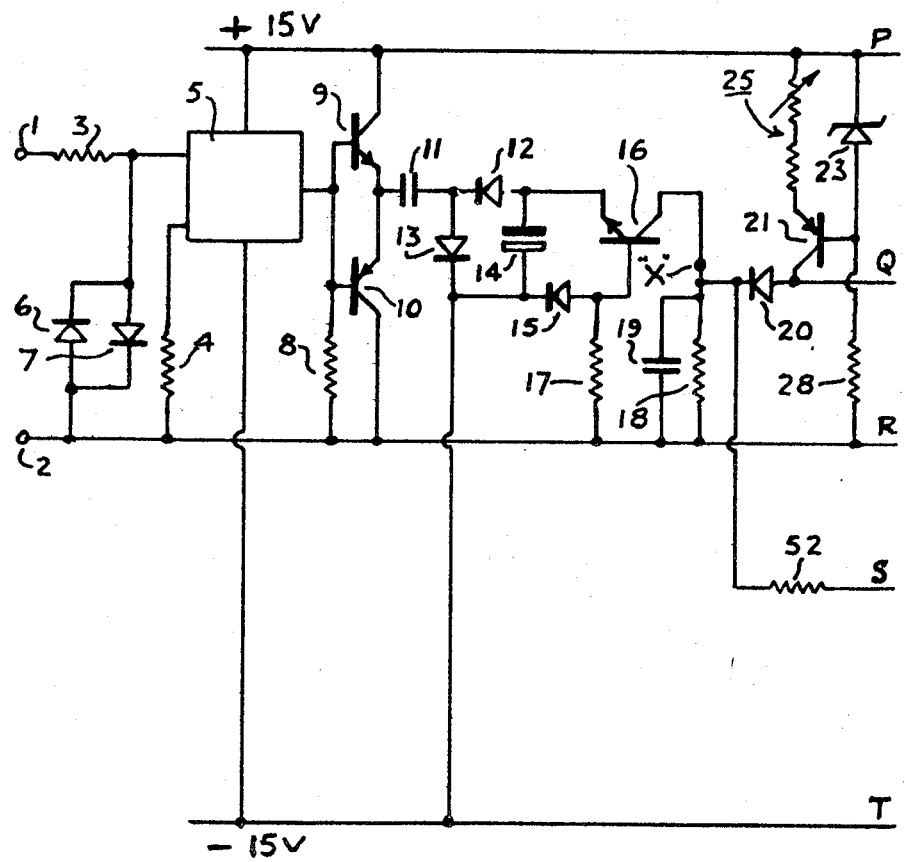
FIG. 2a and 2b illustrates a circuit arrangement for providing, in conjunction with a braking system, correction for wheel slide.
Figure 2B:
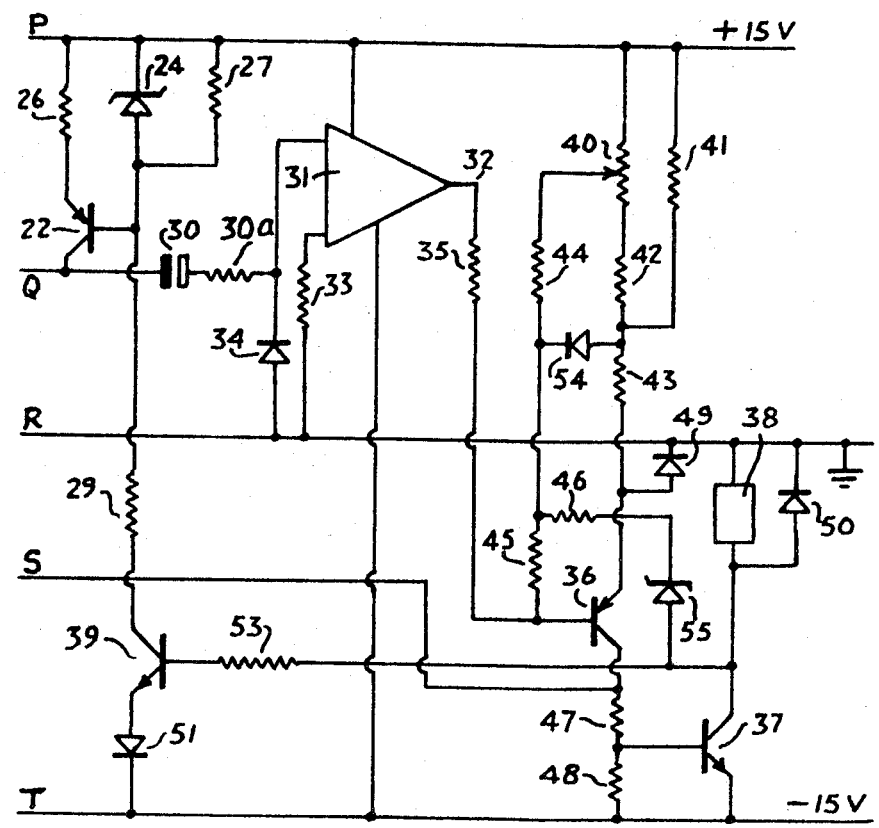

Considering now the circuit illustrated in FIGS. 2a and 2b of the drawings, the circuit has two input terminals 1 and 2 which are connected to an AC frequency generator (not shown) driven by the braked aXle or wheel of the vehicle in question. The input is applied via resistors 3 and 4 to a constant amplitude square wave shaping circuit of any suitable known form such as a Schmitt trigger represented by block 5 supplied with energy from main +15-volt and −15-volt supply lines to the circuit. Voltage limiting diodes 6 and 7 are also connected across the input to 5 for suitable protection against excessive voltage being applied to 5.

The output of circuit 5 is applied to a pair of emitter follower transistors 9 and 10 connected as shown and having a common base resistor 8. The emitters of the transistors are connected in common to a familiar form of diode pump circuit embodying a capacitor 11, diodes 12 and 13 and a capacitor 14. The diode 15 constitutes a base biasing diode for a further transistor 16 to which the diode pump output is applied. The transistor 16 is arranged moreover to produce as an output at point X across a resistor 18 and capacitor 19, a voltage variable between say 0 and −12 volts according to the variation from 0 m.p.h. (zero frequency of the generator) to the maximum wheel peripheral speed.

Voltage at X appears at the cathode of a diode 20 the anode of which is connected in common to the collectors of transistors 21 and 22 each arranged with base biasing Zener diodes 23 and 24 and resistors 25, 26, 27, 28 and 29 to operate as constant current devices, the current which 21 supplies being variable by manual adjustment of 25.

The collectors of these transistors 21 and 22 are further connected to a capacitor which as will be seen hereafter, constitute the storage device of the charge/discharge circuit and stores an independently varying signal referred to previously, by discharging at a predetermined rate. The other side of the capacitor 30 is connected to an operational amplifier 31 via a resistor 30a. The amplifier 31 may be of any suitable form known to those skilled in the art and produces at the point 32 a voltage substantially zero for constant speed but variable for changing speed down to about −12 volts according to deceleration of the wheel in question.

The signal at 32 is applied via a resistor 35 to the base electrode of a transistor 36 which in conjunction with a transistor 37 and associated resistors and diodes, constitutes a two state trigger circuit, to control a relay 38 and a transistor 39 to be referred to hereafter.

The biasing arrangement for transistor 36 includes resistors 40, 41, 42, 43, 44, 45 and 46 connected as shown, 40 being a variable potentiometer to set the bias of 36 to operate at a desired rate of change of speed. The base electrode of 37 is connected to the junction of 47 and 48 in the collector circuit of transistor 36. Diodes 54 and 55 will be referred to hereafter but it may be mentioned at this point that they provide an alternative base biasing path for the trigger to provide an increased sensitivity for the trigger to enable it to hold operated for lower values of rate of change of speed after initial triggering.

The transistor 22 referred to above has its base electrode connected via a resistor 29 in the collector path of a switching transistor 39 referred to above and having a diode 51 in its emitter circuit and operated by the voltage at the collector of 37 via a resistor 53. This enables the trigger circuit to switch in and out the constant current element in the circuit provided by the transistor 22. Further, operating considerations dictate a requirement for a feedback resistor 52 between the collector electrode of transistor 36 and the point X. This compensates for the effect on the voltage at "X" of removal of the constant current element provided by transistor 22, so preventing undesirable chatter in operation of the relay 38.

The relay 38 has contacts not shown but connected, in the embodiment envisaged herein, in the current path to a magnet value operable to blow down the brakes associated with a sliding wheel.

In operation of the circuit arrangement of FIG. 2, the generator connected to terminals 1 and 2 gives rise to a voltage-limited AC signal input to the square wave circuit 5, the frequency being directly proportional to wheel peripheral speed. The output of 5 being applied via emitter follower transistor 9 and 10 to the diode pump circuits, gives rise to a voltage at the point X directly proportional to the peripheral speed of the wheel.

Under normal conditions of constant speed running or wheel deceleration with no sliding, the transistors 21 and 22 each conduct and the voltage on the capacitor 30 follows the voltage at the point X. Also, the transistors 36 and 37 of the trigger circuit are normally "off" so that the relay 38 is unoperated and transistor 39 is conducting to enable 22 to carry a current.

When excessively rapid deceleration of the wheel occurs due to braking forces being incompatible with adhesion between wheel and track, the output from the circuit 31 surpasses the bias set by the potentiometer 40 and applied to the base of transistor 36, and 36 becomes conducting together with 37. The relay 38 is thereby operated and via the means not shown causes brake blowdown. This corresponds to point A on the diagram of FIG. 1.

When transistor 37 is rendered conducting as aforesaid, the transistor 39 which was previously conducting becomes nonconducting due to removal of the base drive via 53 and transistor 22 is thereby rendered nonconducting. The charge on 30, which at the instant of triggering is analogous of the wheel speed at that point, can now decline at a reduced rate owing to the removal of the constant current element provided by transistor 22. The rate of decline of charge on 30 is thus determined by the setting of 25 and diode 20 blocks.

The performance of the wheel is now somewhat as shown by the section ABC of the solid curve of FIG. 1.

When the wheel speed curve turns upwards after lower speed point B, the voltage at point X of the circuit approaches a value corresponding to the voltage on the capacitor 30 and when the voltage at point X of the circuit again overcomes the forward blocking voltage across diode 20, this diode conducts again and the output of the differentiating circuit, which now receives an "accelerating" input, enables 36 and 37 again turning off relay 38. Also, this blocking by 37 causes 39 to restart drive to constant current device 22 which again conducts such that the charge on 30 is restored to normal operation with very short time constant and continues to follow the voltage at X until another "slide" tends to occur. Thus the period DE is available for recovery of the braking system.

As referred to previously, the Zener diode 55 and the diode 54 provide an alternative bias path for the transistor 36 so that following triggering and conduction of 37, 36 is maintained conducting for the lower value of "deceleration" as determined by the declining charge on capacitor 30 until the wheel speed is pulled back to point C of the curve of FIG. 1.

By varying the setting of the resistor 25 in the emitter circuit of transistor 21 which remains conducting following tripping of the trigger circuit, the rate of discharge of capacitor 30 can be varied to give a desired amount of "advance" with regard to initiation of reinstatement of braking effort before the wheel has actually restored to vehicle speed following a slide. Further, the wheel retardation rate for which the trigger circuit is tripped to blow down the brakes on occurrence of a slide, is variable by adjustment of the potentiometer 40 which determines the normal bias to the transistor 36.

While the present invention has been described above in relation to a braking system and provides for slide protection, the invention is equally applicable to wheel spin protection under traction to obtain optimum traction efficiency by providing "advance" of reinstatement of tractive effort applied to wheels, following correction of spin, prior to the instant at which full wheel to rolling surface adhesion occurs.

Figure 3A:
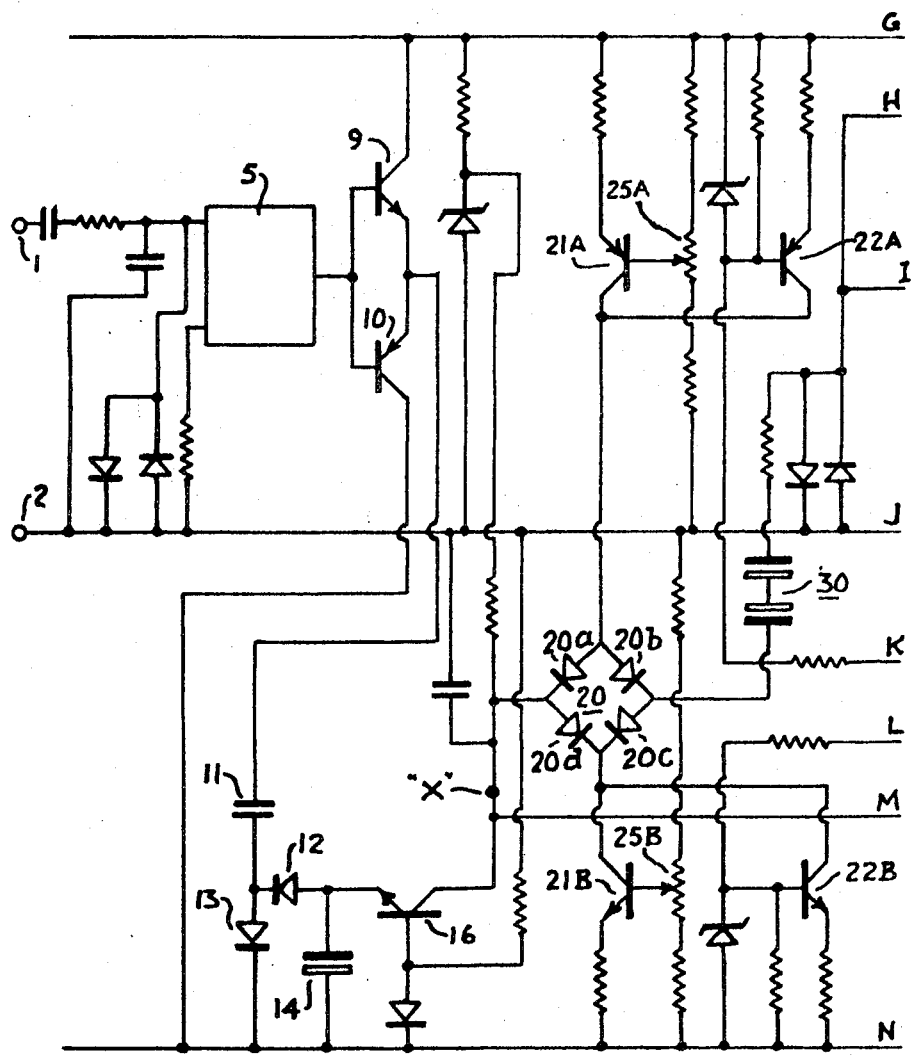
FIG. 3a and 3b illustrates a circuit arrangement for providing, in conjunction with a tractive and braking system, spin and slide correction.
Figure 3B:
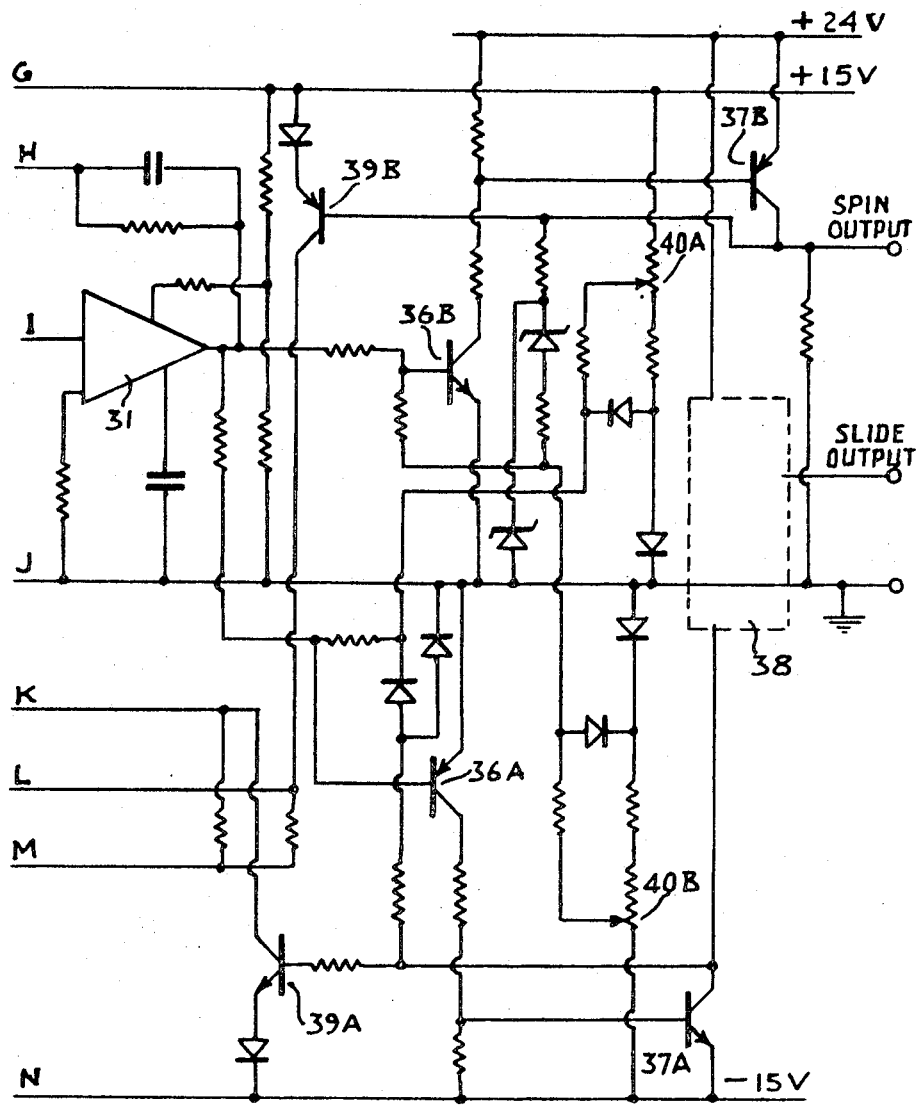

The circuit of FIG. 3 is a comprehensive circuit capable of providing combined spin (under traction) and slide (under braking) protection.

FIG. 3 is little more than a duplication of the triggers of the circuit of FIG. 2 following the differentiating circuit. In addition, means is provided so that the diode pump output at point X can fluctuate from −6 volts to +6 volts and the diode 20 of FIG. 2a is replaced by a bridge rectifier to give two senses of operation. The bridge rectifier circuit has associated with it transistors 21A, 21B which are independently adjustable to provide settings for the discharge rates of capacitance 30 which corresponds to capacitor 30 of FIG. 2. The circuit will not be described in detail as it adds little to the basic disclosure of FIG. 2 but in order to clarify it, brief discussion of the operation is now given using the same reference numerals where they correspond to those of FIG. 2 with the suffix A where they relate to slide protection and suffix B where they relate to spin correction.

Under braking conditions, the voltage at X is again normally analogous to wheel speed and is applied via the bridge rectifier 20 and capacitance 30 to the differentiator amplifier 31. On a retardation greater than that determined by the bias set by 40A, the trigger transistor 36A is rendered conducting along with transistor 37A to operate the output voltage conversion circuit 38 and blow down the brakes. At the same time, transistor 39A becomes nonconducting and cuts 22A off. Thus, diodes 20a and 20c are back biased by the voltage on 30 until the wheel speed picks up again to equalize this voltage as before (at point of FIG. 1) and reinstate the normal condition of the trigger via the differentiating circuit. The trigger circuit therefore reverts to 36A and 37A off, 38 unactuated to allow brake recovery and 22A on to allow the voltage on C to follow that at X with short time constant again.

Under traction conditions, the voltage at X is again analogous of wheel speed and is applied via 20 and 30 as before, to the differentiator 31. On an acceleration greater than that determined by the bias set by 40B occurring the transistor 36B of the spin trigger circuit is rendered conducting along with the transistor 37B to, on the one hand, initiate correction by means not shown (by e.g. pinch braking) and, on the other hand, to render transistor 39B nonconducting and, therefore, also constant current feed transistor 22B. The only effective path for current from the capacitor 30 is, therefore, now via transistor 21B, diodes 20C, 20B, and 20D being back biased. The rate of charge of 30 is thus determined, by the setting of 25B. When the speed of the runaway wheel has returned towards the speed to which the rising capacitor charge is analogous, the trigger circuit resets as for the "slide protection" described above and the correction for spinning removed somewhat in advance of the point at which "-complete adhesion" recurs.

In the above described embodiments of the invention, the trigger current is held operated to maintain a correction up to a desired point such as point C in FIG. 1, after initiation of a correction, by sensing the existence of more than a predetermined rate of change of signal in the storage device. However, alternative means of achieving this may be employed if desired. For example, circuit means can be provided which compares the speed signal representing the actual peripheral speed of the wheel with the varying signal in the storage device. In this case, the trigger is released to remove the modification signal when there is a predetermined relationship, preferably equality between these compared signals.

Figure 4:
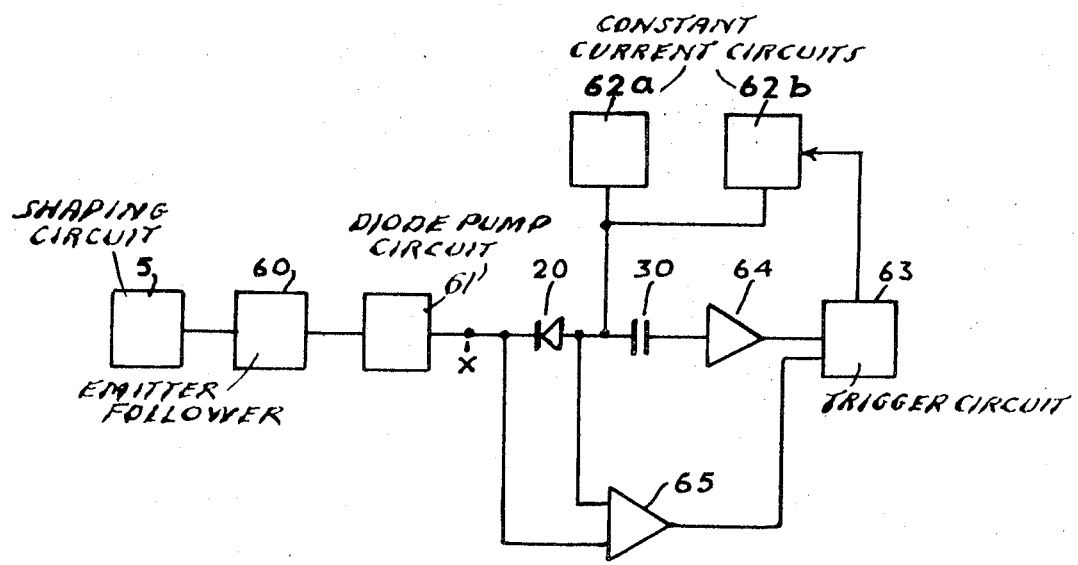
FIG. 4 illustrates in block schematic form an alternative form of circuit for apparatus in accordance with the invention.

To further clarify this, reference may be made to FIG. 4 of the drawings which illustrates in block diagrammatical form the relevant parts of apparatus modified on the above lines.

In FIG. 4, the voltage-limited signal derived from the wheel generator is applied to the shaping circuit represented again by block 5 and the output of this is presented to the emitter follower stage 60 the output of which is applied to the diode pump circuit 61 to provide at the point X of FIG. 4 a signal voltage representation of wheel speed as before. The voltage at X is then applied via the diode 20 to the capacitor 30 which normally stores a charge corresponding (apart from the voltage drop in 20) to the voltage at X. This charge is normally supplied via the constant current circuits 62a and 62b the latter of which is cut out on operation of the trigger circuit 63 to give a prolonged time constant for discharge or charge of 30 as the case may be following blocking of 20 as before. The differentiating amplifier is shown as block 64 and operates the trigger 63 to produce the modification signal when the acceleration or deceleration of the wheel as the case may be becomes excessive. In accordance with this aspect of the invention a difference amplifier 65 is now provided inputs to which are derived from either side of the rectifier 20 to hold the trigger 63 in the operated condition to maintain the modification signal while the voltage across 20 is greater than the normal voltage drop across 20 when conducting. In this way the modification is maintained following detection of excessive acceleration or deceleration as the case may be for the period such as is represented by the time between A and C in the diagram of FIG. 1 for operation of slide correction under braking.

In a system such as described in the foregoing, other detail modifications or refinements may be applied if desired. For example, means may be provided for in the event of a slide correcting being effective for more than a predetermined time, cutting out the slide control part of the equipment, thereby enabling the braking to be restored in the events of a fault in the slide detection system. This provides a failure-to-safety feature. Again, it may be that slide control may not be required to operate below a certain speed of a vehicle in order that an impact by a further following vehicle being drawn by the first, giving rise to a skid of the first vehicle, will not cause blowdown of the brakes under low-speed conditions. Blowdown of brakes at such a time could cause the vehicles to overshoot a desired stopping point.

Having thus described my invention, what I claim is:

1. A system for controlling forces tending to produce changes in wheel speed of a wheeled vehicle which tend to destroy the correspondence between the wheel speed and the vehicle speed comprising means for deriving a speed signal representative of the peripheral velocity of a wheel of the vehicle and for deriving a further signal representing the rate of change of the peripheral speed of the wheel, and control means for producing, responsive to said further signal exceeding a predetermined value corresponding to an excessive rate of change of peripheral velocity, a control signal for modifying the forces exerted on the wheel, said control means further comprising means, including a storage device, for generating, upon production of said control signal by said control circuit means, a variable signal which varies independently of said speed signal and which attains a predetermined relationship relative to said speed signal in advance of regained correspondence between the vehicle speed and the wheel sped, and means responsive to the attainment of said predetermined relationship for initiating at least partial removal of said control signal.

2. A system as claimed in claim 1, wherein said variable signal generating means comprises a circuit for controlling charging and discharging of said storage device such that the signal produced by said storage device normally follows said speed signal in the absence of the production of said control signal but varies independently of said speed signal upon the production of said control signal.

3. A system as claimed in claim 2 wherein said circuit for controlling charging and discharging of said storage device includes means for causing said variable signal to vary substantially linearly at a rate slightly in excess of a preselected rate corresponding to a normally acceptable rate of change of peripheral velocity until the attainment of said predetermined relationship.

4. A system as claimed in claim 3, wherein said control circuit means includes means responsive to the rate of change of the variable signal exceeding a preselected value for maintaining the production of said control signal, following initiation thereof, until said preselected value is no longer exceeded, said control signal being effective to increase the sensitivity of said control circuit means such that said preselected value is substantially less than the predetermined value corresponding to an excessive rate of change of peripheral velocity.

5. A system as claimed in claim 4, wherein said storage device comprises an electrical capacitance and said circuit for controlling charging and discharging of said storage device includes a constant current device connected to said capacitance to cause the voltage thereon to vary at a first rate, said system further comprising a further constant current device connected to said capacitance to cause the voltage thereon to vary at a second, different rate in the absence of the production of said control signal.

6. A system as claimed in claim 1 wherein said means for producing said speed signal produces a direct current speed signal, said system further comprising a rectifier connected between the output of said speed signal producing means and said storage device which, in response to the production of said control signal, is reversed biassed by the storage device signal and hence blocks current flow therethrough.

7. A system as claimed in claim 6 wherein said storage device comprises a capacitance, said system further including an amplifier for cooperating with said capacitance to provide said signal representing the rate of change of peripheral speed.

8. A system as claimed in claim 7 wherein said control circuit means includes a triggering circuit for producing said control signal and a differential amplifier having inputs connected on both sides of said rectifier for maintaining said triggering circuit in the operated state thereof during the time that the voltage drop across the rectifier is greater than the normal voltage drop across the rectifier when conducting.

75